(12) United States Patent
Mittal

(10) Patent No.: US 6,775,535 B2
(45) Date of Patent: Aug. 10, 2004

(54) DECISION-BASING APPARATUS, AND AN ASSOCIATED METHOD, FOR RADIO DEVICE RESPONSIVE TO ORIGINATION SOURCE OF DATA SENT THERETO

(75) Inventor: Gaurav Mittal, San Diego, CA (US)

(73) Assignee: Nokia Corporation, Espoo (FI)

( * ) Notice: Subject to any disclaimer, the term of this patent is extended or adjusted under 35 U.S.C. 154(b) by 429 days.

(21) Appl. No.: 10/066,385

(22) Filed: Jan. 31, 2002

(65) Prior Publication Data

US 2003/0143977 A1 Jul. 31, 2003

(51) Int. Cl.⁷ .......................... H04M 11/00; H04M 1/66; H04M 1/68; H04M 3/16
(52) U.S. Cl. .................. 455/406; 455/405; 379/114.01; 379/114.02; 379/114.1
(58) Field of Search ................................. 455/405–410; 379/111, 112.01, 114.01, 114.05, 114.1, 114.02

(56) References Cited

U.S. PATENT DOCUMENTS 6,108,406 A * 8/2000 Mitchell et al. ......... 379/93.25
6,622,017 B1 * 9/2003 Hoffman ...................... 455/419

\* cited by examiner

Primary Examiner—Duc Nguyen

(57) ABSTRACT

Apparatus, and an associated method, for allocating charges that accrue to download content to a mobile station from a data source, either a third-party data source or a system-operator data source. An SMS message is generated at an SMS center that includes an identification of the type of data source that is to originate the data. A detector at the mobile station detects the SMS message and the identification of the type of data source at which the content is to be originated. A table is accessed, and a calling number associated with the data source is retrieved therefrom. A terminal management session is thereafter formed utilizing the retrieved calling number. The calling number forms either a toll number or a toll-free number and is determinative of to where charges shall be allocated to download the content.

21 Claims, 4 Drawing Sheets

DECISION-BASING APPARATUS, AND AN ASSOCIATED METHOD, FOR RADIO DEVICE RESPONSIVE TO ORIGINATION SOURCE OF DATA SENT THERETO

The present invention relates generally to a manner by which to base a decision, such as how to allocate charges accruing as a result of downloading of an application, or other content, to a mobile station operable in a cellular, or other radio, communication system. More particularly, the present invention relates to apparatus, and an associated method, by which to allocate charges, or make other operational decisions associated with the downloading of the content either to a service subscription, or other account, pursuant to which the mobile station is operable or elsewhere, such as a system operator. A data message is sent to the mobile station to initiate the downloading of the content. The data message includes an indication of the data source from which the content to be downloaded originates. The data source from which the content originates is determinative of the decision, such as to where the charges shall accrue. If, for instance, the data source forms a third-party data source, charges accrue to the service subscription of the mobile station. And, for instance, if the data source forms a system-operator data source, the accrued charges are absorbed by the system operator.

BACKGROUND OF THE INVENTION

The communication of data is a necessary adjunct of modern society. Data is communicated between remote locations pursuant to many different activities. A communication system through which the data is communicated includes, at a minimum, a sending station and a receiving station, interconnected by a communication channel. Many different types of communication systems have been developed, and implemented, to permit the effectuation of communication of data to effectuate many different communication services.

Radio communication systems are exemplary of communication systems that are regularly utilized. Radio communication systems are utilized, for instance, to effectuate telephonic communications. In a radio communication system, communications are effectuated by way of communication channels defined upon a radio link formed between sending and receiving stations. Because radio links are utilized, communications between sending and receiving stations of a radio communication system can be used to effectuate the communications when positioning of a wireline connection between the sending and receiving stations would be impractical or otherwise not permitted.

A cellular communication system is a type of radio communication system. The networks of various types of cellular communication systems have been installed throughout significant portions of populated areas of the world. And, cellular communication systems have achieved wide levels of usage by large numbers of users who subscribe pursuant to a subscription service to communicate therethrough.

Communication stations of a radio communication system that provide for two-way communications form radio transceivers. The radio transceivers capable of both sending and receiving signals upon radio links extending between the radio transceivers. Radio transceivers of the network part of a cellular communication system are referred to as base transceiver stations (BTSs), and radio transceivers carried by subscribers, i.e., users, that subscribe to communication services in the system are sometimes referred to as mobile stations.

Successive generations of cellular communication systems have been developed and installed throughout extensive portions of the world. Reference is commonly made to at least three generations of cellular communication systems. A so-called, first-generation, cellular communication system generally refers to a cellular communication system that utilizes an analog modulation technique. A so-called, second-generation, cellular communication system typically refers to a cellular communication system that utilizes a digital, multiple-access communication scheme. Third-generation, cellular communication systems are presently under development and implementation. Third-generation systems also generally utilize digital, multiple-access communication schemes.

Mobile stations, particularly those utilized in second- and subsequent-generation communication systems, utilize processing circuitry to operate upon digitally-encoded signals transmitted during operation of the communication system. The processing circuitry can be utilized to perform other processing functions in addition to operating upon signals utilized to effectuate telephonic communications.

An application program is and, more generally, content is executable by such processing circuitry. The terms content and application program shall, at times, be used herein interchangeably, but shall each refer to any type of digital information. Content, executable or otherwise usable by the processing circuitry, is typically stored at a memory device that is accessible by the processing circuitry. The content is stored at the memory device, usually during construction of the mobile station or, subsequent thereto, by downloading the content thereto.

The content downloaded to the mobile station is sometimes originated at a computer server connected to a packet data network to which the network part of the cellular communication system is connected.

An operator of the cellular communication system might also want to download content to the mobile station. Such content is used at the mobile station, for instance, to upgrade operating performance of the mobile station or to alter operating parameters pursuant to which the mobile station operates.

As the content is downloaded to the mobile station by way of a radio link, charges are generally associated with the use of the radio links to communicate the content. When the downloading of the content is to be for the benefit of the system operator rather than the subscriber, it, generally, would be inappropriate to charge the communication of the content to the service subscription account, necessitating payment by the subscriber. If, however, the content is provided by the third-party computer server for the benefit of the subscriber, it would, conversely, generally be appropriate to charge the service subscription account for the downloading of the content to the mobile station.

A manner is needed by which to allocate the charges that accrue to download content to the mobile station.

It is in light of this background information related to communication of content to a mobile station in a radio communication station that the significant improvements of the present invention have evolved.

SUMMARY OF THE INVENTION

The present invention, accordingly, advantageously provides apparatus, and an associated method, by which to base a decision, such as how to allocate charges accruing as a result of downloading of an application, or other content, to a mobile station operable in a cellular, or other, radio communication system.

Through operation of an embodiment of the present invention, a manner is provided by which to base a decision, such as how to allocate the charges associated with the downloading of the content either to a service subscription, or other account, pursuant to which the mobile station is operable or elsewhere, such as to a system operator.

A data message is sent to the mobile station to initiate the downloading of the content. The data message includes an indication of the data source from which the content to be downloaded originates. The data source from which the content originates is determinative of the operational decision is made at the mobile station, such as to where the charges shall accrue.

In one aspect of the present invention, content sourced at a third-party data source is selectably provided to the mobile station. The content is downloaded to the mobile station pursuant to a terminal management session. When the source of the content is determined to be the third-party data source, charges accruing as a result of the downloading of the content to the mobile station are allocated to the service subscription pursuant to which the mobile station is operable. That is to say, charges for the "air time" needed to download the content to the mobile station accrue to the mobile station.

In another aspect of the present invention, content sourced at a system-operator data source is selectably provided to the mobile station. The content is downloaded to the mobile station pursuant to a terminal management session. When the source of the content is detected to be the system-operator data source, charges accruing as a result of the downloading of the content to the mobile station are allocated to the system operator. That is to say, charges for the "air time" needed to download the content to the mobile station are absorbed by the system operator.

In another aspect of the present invention, when content is to be downloaded to a mobile station, a data message is first generated and sent to the mobile station. When the communication system comprises a GSM (global system for mobile communications) cellular communication system that provides for SMS (short message service) messaging, the data message sent to the mobile station to initiate downloading of the content thereto forms an SMS message. The data message includes a field containing, or otherwise provides, values representative of the type of data source from which the content originates.

In another aspect of the present invention, when the mobile station detects the data message sent thereto to initiate a terminal management session during which content is to be downloaded to the mobile station, the mobile station operates upon the data message to determine the type of data source at which the content to be downloaded to the mobile station originates.

The mobile station includes a table containing a listing. The listing includes values of indicia representative of the identification of the type of data source at which the content to be downloaded to the mobile station originates. A calling number is associated with the indicia. Upon detection of the data message at the mobile station and operation thereon to retrieve information contained in the data message, the values contained in the field, or otherwise contained in, the data message form the indicia at the listing contained in the table. The listing is accessed, and the calling number associated with the indicia is retrieved. The retrieved calling number is used to initiate a call to the calling number retrieved from the listing contained in the table. A communication session forming a terminal management session is thereafter formed. And, once the terminal management session is formed, the content is downloaded to the mobile station.

The calling number is either a toll number or a toll-free number. When the data source forms a system operator data source, the calling number forms a toll-free number. And, when the calling number is retrieved and used to form the terminal management session, charges do not accrue to the mobile station. And, if the data source forms a third-party data source, the calling number forms a toll number such that, when a terminal management session is formed subsequent to entry of the toll number, charges accruing during the terminal management session in which the content is downloaded to the mobile station accrue to the service subscription associated with the mobile station.

Content is downloaded to the mobile station while appropriate allocation of the charges accruing to permit the download of the content is made.

In another aspect of the present invention, other types of data are downloaded to the mobile station. Again, a data message is communicated to the mobile station to initiate a terminal management session therewith. The data message includes an indication of the source of the data that is to be downloaded to the mobile station. The mobile station, upon detection of the data message operates thereupon to determine the type of data source at which the data to be downloaded to the mobile station originated. The additional types of data downloadable to the mobile station include, for example, user interface display indicia. Depending upon the source of the initiator of the content to be downloaded to the mobile station, control over the display displayable upon a display element of the mobile station, selection is made by the mobile station whether to permit control over the display displayable at the mobile station to be permitted of the initiating server. If allocation of control is not provided to the initiating server, control over the display upon the display element of the user interface of the mobile station is maintained at the mobile station. Data might also include, for instance, a WML (wireless mark-up language) card to be sent to the mobile station by a server. Depending upon the source of the WML text card, a determination is made whether to utilize the WML card provided by the originating server or to utilize, instead, a WML card already stored at the mobile station.

In these and other aspects, therefore, apparatus, and an associated method, for a radio communication system is provided. The radio communication system has a network part and a mobile station to which data is selectably communicated pursuant to a data call. The data is sourced at a selected data source. Apparatus for the mobile station facilitates allocation of data call charges accruing pursuant to the data call. A detector is coupled to detect indications of a request initiated at the selected data source for formation of the data call. The indications of the request include indicia identifying, at least by type, the selected data source. A table contains a listing. The listing is of indicia included as part of the request to which the detector is coupled to detect. The indicia is indexed together with a calling number associated with the indicia. The calling number identifies whether the data call charges accruing pursuant to the data call shall accrue to the mobile station. A data call initiator is coupled to receive indications of the calling number indexed together with the indicia at the table and corresponding to the indicia contained in the indications of the request detected by the detector. The data call initiator initiates the data call responsive thereto.

A more complete appreciation of the present invention and the scope thereof can be obtained from the accompanying drawings which are briefly summarized below, the following description of the presently-preferred embodiments of the invention, and the appended claims.

DETAILED DESCRIPTION

Figure 1:
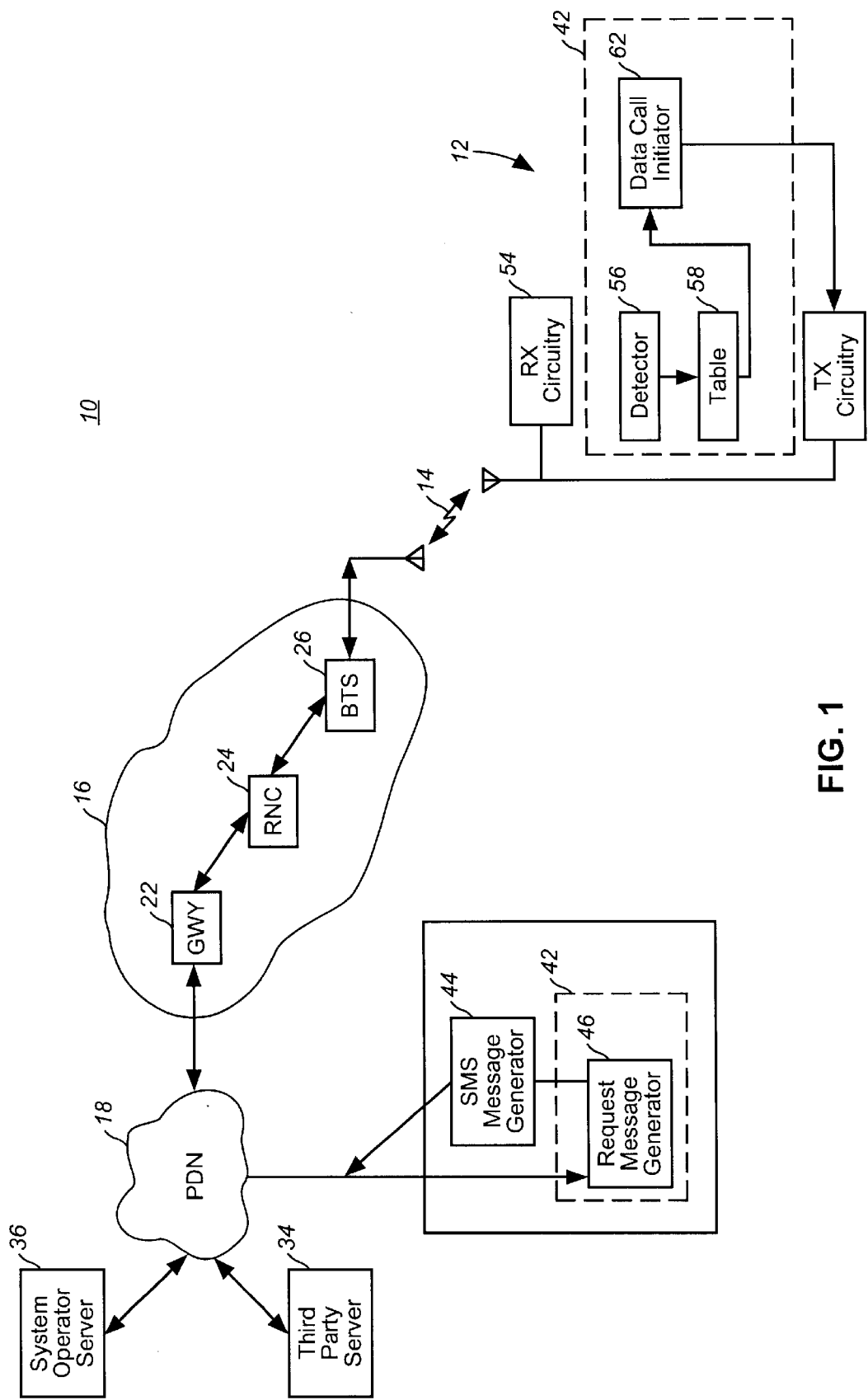
FIG. 1 illustrates a functional block diagram of a radio communication system in which an embodiment of the present invention is operable.

Referring first to FIG. 1, a radio communication system, shown generally at 10, provides for radio communication with mobile stations, of which the mobile station 12 is exemplary. Data is communicated between the mobile station 12 and a network part of the communication system by way of radio links 14 defined upon a portion of the electromagnetic spectrum allocated for use by the communication system.

In the exemplary implementation, the communication system is formed, in part, of a GSM (global system for mobile communications) cellular communication system that provides for SMS (short message service) messaging. It should be understood at the outset that, while the following description of operation of the communication system 10 shall describe its exemplary implementation as such a GSM system, the teachings of the present invention are analogously implementable in other types of radio communication systems. Operation of an embodiment of the present invention implemented in such other type of radio communication system can analogously be described.

The network part of the radio communication system includes a radio access network (RAN) 16 and a packet data network (PDN) 18, such as the internet backbone. The packet data network and the radio access network are connected together by way of a gateway (GWY) 22 that forms a portion of the radio access network. The radio access network is here shown also to include a radio network controller (RNC) 24 and a base transceiver station (BTS) 26 coupled thereto. The radio network controller and base transceiver station are sometimes together referred to as a base station system (BSS). The radio network controller operates to control operation of the various aspects of the radio access network. And, the base transceiver station operates to transceive communication signals upon the radio link 14 formed with the mobile station 12. Data to be communicated to the mobile station is referred to be communicated upon a forward link channel, and data communicated by the mobile station to the network part is referred to as being communicated upon a reverse link channel.

An SMS (short message service) center 32 is coupled to the packet data network. The SMS center operates to generate SMS messages, in conventional manner, that are routed through the packet data network and the radio access network for communication to the mobile station pursuant to an SMS message delivery service. Requests for generation of SMS messages are directed to the SMS center whereat the SMS messages are generated for routing through the network part of the communication system and subsequent transmission to, and delivery at, the mobile station.

Data sources, here computer servers that contain data databases, are also shown to be coupled to the packet data network. Here, a third-party server 34 and a system-operator server 36 are both shown to be coupled to the packet data network. Data stored at the respective servers can selectably be retrieved therefrom and routed through the network part of the communication system for subsequent transmission to the mobile station. Content sourced at one of the servers 34, 36 can thereby be downloaded to the mobile station.

The third-party server contains, for instance, source codes forming applications that, when downloaded to, and installed at, the mobile station, are executable thereat. Such applications generally provide the user of the mobile station with some benefit and are used by the subscriber to the mobile station for business or entertainment purposes. Analogously, data sourced at the system-operator server also, for instance, forms applications that, when downloaded to, and installed at, the mobile station, are executable thereat. Other content sourced at the system-operator server is also downloadable to the mobile station to be used thereat. The applications and other content downloadable to the mobile station by the system-operator server is generally used to facilitate communication operations in the communication system. Sometimes primarily for the benefit of the system operator.

As "air time", i.e., allocation of channels upon the radio link 14, is controlled and regulated pursuant to a service subscription purchased by a subscriber of the mobile station, allocation of the air time to permit the downloading of content of a computer server, such as the servers 34 or 36, is generally provided pursuant to the service subscription.

When the content to be downloaded to the mobile station is sourced at the system-operator server, the costs associated with the downloading of the content are generally, more appropriately, to be absorbed by the system operator. Conversely, when the content to be downloaded to the mobile station is primarily for the benefit of the subscriber of the mobile station, such as when the content is to be downloaded by the third-party server, the charges are generally, appropriately allocated to the subscriber of the mobile station. Operation of an embodiment of the present invention provides a convenient manner by which to allocate the charges that accrue pursuant to the downloading of the content.

A capability is provided by which to charge a subscriber utilizing a mobile station for downloading of content requested by an end user. Charges are not levied on, i.e., allocated to, the end user for operations that are performed by the system operator pursuant to system operation. For instance, upgrades to operating software that is used by the mobile station, changes in operating parameters, such as changes to NAM values, etc., can all be downloaded to the mobile station by the system-operator.

Accordingly, pursuant to an embodiment of the present invention, the mobile station 12 includes apparatus 42 of an embodiment of the present invention. And, in the exemplary implementation, the SMS center 32 includes further apparatus, also shown at 42, of an embodiment of the present invention. The elements forming the apparatus 42 of both the mobile station and the SMS center are functionally represented and can be implemented in any desired manner, such as by algorithms executable by processing circuitry.

When content is to be downloaded by a data source, such as a computer server 34 or 36, a message indicating initiation of a request to download the content is generated at, or otherwise responsive to, the data source. The request is a data message that is routed through the packet data network for delivery to the SMS center. The data message is conventional of a data message that is conventionally provided to an SMS center to be forwarded by the SMS center to the mobile station by way of the radio access network.

The SMS center here is shown to include an SMS message generator 44 to which the apparatus 42 is coupled. When a request to initiate downloading of content to the mobile station is delivered to the SMS center, an indication of the request is provided to the apparatus 42. The apparatus includes a request message generator 46 that generates a request message, here on the line 48, that is provided to the SMS message generator. The request message generator 46, in the exemplary implementation, operates to generate values that are populated into a field of the SMS message that is generated by the SMS generator 44. The request message generator determines the origin of the request initiation routed thereto. If the initiation of the request is originated by a third-party data source, here the server 34, the request message generator forms values that populate a field in the SMS message that is generated by the SMS message generator 44 to indicate the origin of the request to be the third-party. And, if the origin of the initiation of the request is the system operator data source, here the system-operator server 36, the request message generator generates values representative of a system-operator and causes a field of the resultant SMS message to indicate that the initiation of the request is by the system-operator.

In the exemplary implementation, the SMS message generated by the SMS message generator also includes an identifier, such as the URL, of the data source.

Once generated, the SMS message is routed through the packet data network and the radio access network, thereafter to be transmitted to the mobile station upon a forward link channel defined upon the radio link 14. Receive circuitry 54 of the mobile station receives and operates upon the SMS message received at the mobile station. The apparatus 42 is coupled to the receive circuitry to receive indications of the SMS message.

The apparatus 42 includes a detector 56 that operates to detect the values of the indications of the request formed of the SMS message. And, more particularly, the detector detects the data source-type field of the SMS message when the values of the field are extracted from the SMS message, the values are used to access a listing contained at a table 58. The table 58 is formed at a memory storage element of the mobile station. The listing contained at the table includes values of the indicia detected by the detector and extracted from the SMS message. The indicia is indexed together with a calling number associated with the associated data source. The calling number retrieved from the listing contained in the table is used to initiate a call to create a terminal management session between the mobile station and the data source at which the request was initiated. Normal calling procedures are utilized to establish a call connection pursuant to the terminal management session. And, once the terminal management session is created, content is downloaded by the appropriate data source to the mobile station.

The type of calling number is determinative of to whom charges shall accrue pursuant to the terminal management session. When the data source is the system-operator server and charges are to accrue to the system operator or otherwise be absorbed by the system operator, a toll-free calling number is used. And, when charges are properly allocated to the subscriber of the mobile station, a normal toll number is used. Thereby, through designation of the type of calling number contained in the listing of the table 58, allocation of accrued charges is easily made.

Additional types of data are also downloadable to the mobile station through operation of an embodiment of the present invention. And, responsive to the identity of the server that initiates the terminal management session during which the data is to be downloaded to the mobile station, different use is made of the data. For instance, user display indicia, or control over what information is displayed upon a display element of the mobile station, is determined responsive to the source of the data. If, for instance, the data tag contained in the SMS message indicates the source of the initiation request to be a third party server, the mobile station may permit the server to control the user interface display. Conversely, if the request originates at a client-initiated operation, the mobile station retains control over the user interface display. A WML (wireless mark-up language) text card, downloadable by a server to the mobile station, is also selectably utilized by the mobile station, depending upon the detected identity of the originating source. The mobile station, for instance, is able to ignore the downloaded text cards in the event of a client-initiated operation and, conversely, display its own WML text cards.

Additionally, the table 58 maintained at the mobile station can also include a listing of additional properties and features associated with a call. Additional information storable at the listing formed at the table include, for instance, a security algorithm, e.g., MD5 or Basic 64, to be used, a level of security, e.g., Type 1, Type 2, or Type 3, bearer selection, e.g., circuit, packet, or high-speed data, interactive or non-interactive session, etc.

Figure 2:
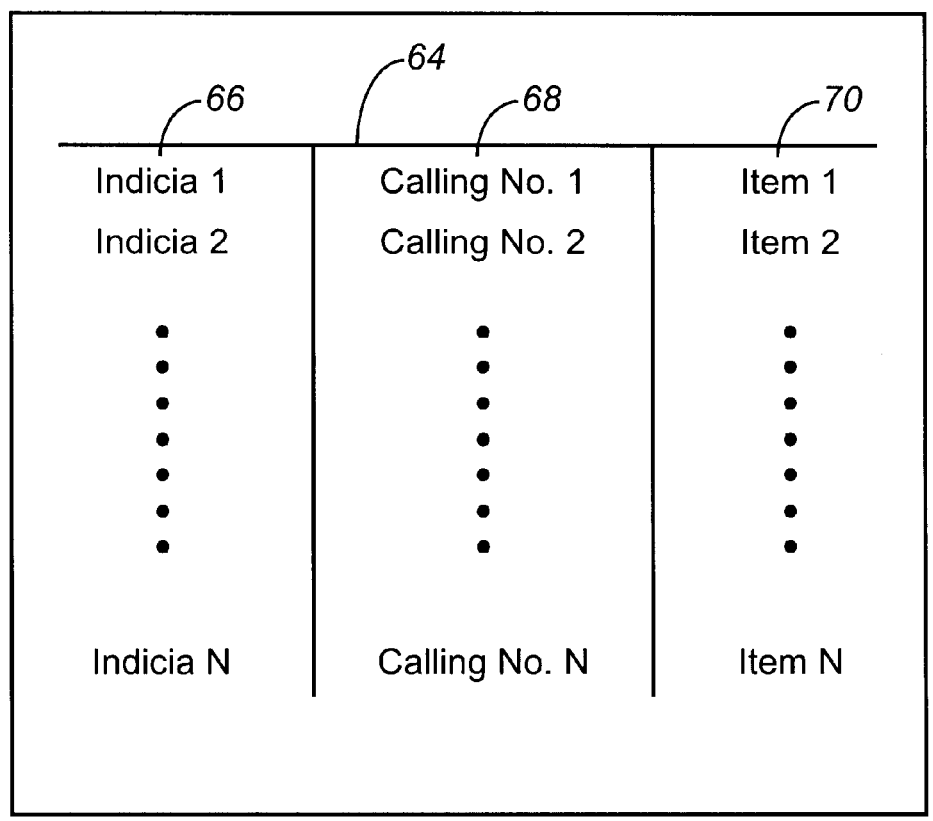
FIG. 2 illustrates a table, exemplary of a table forming a portion of an embodiment of the present invention and forming a portion of the mobile station forming part of the communication system shown in FIG. 1.
Figure 3:
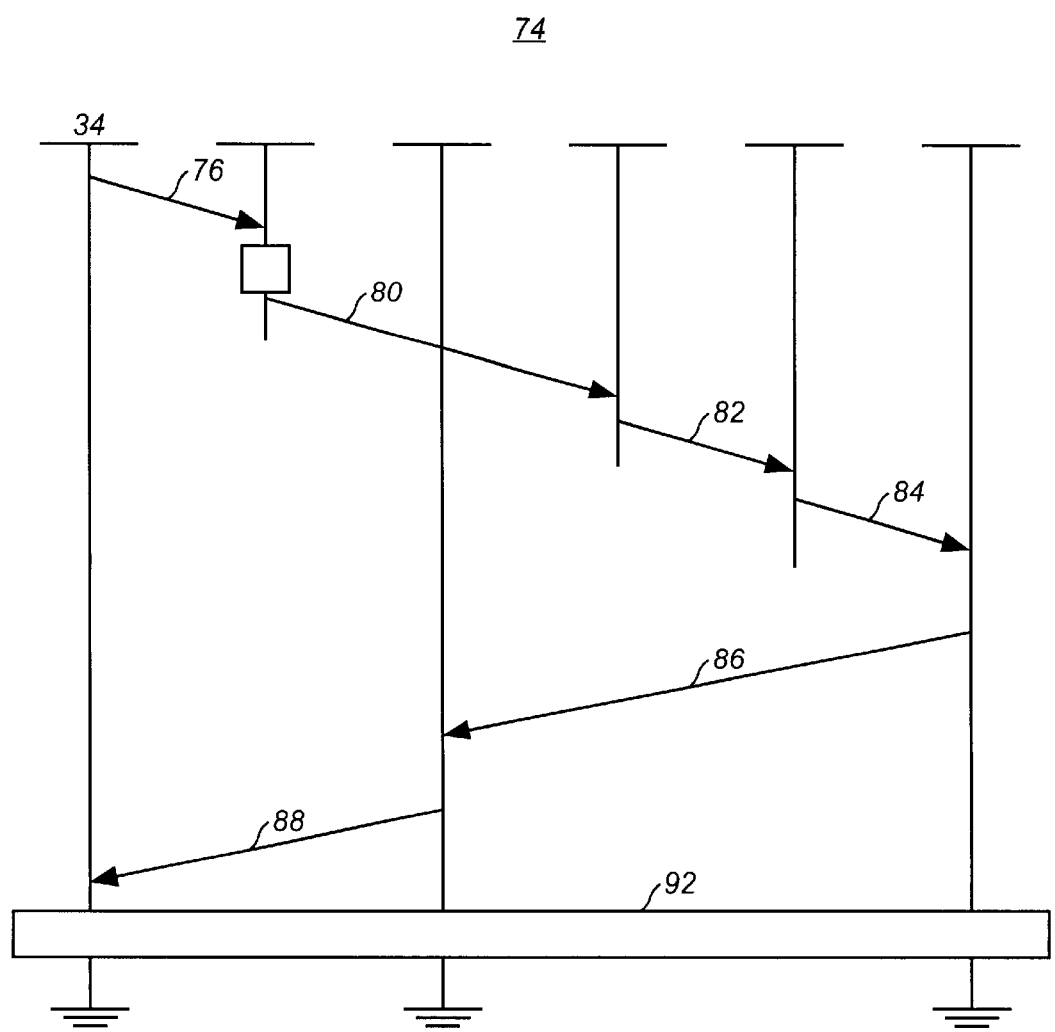
FIG. 3 illustrates a message sequence diagram representative of signals generated during operation of the communication system shown in FIG. 1 pursuant to operation of an embodiment of the present invention by which to download content to the mobile station thereof.

FIG. 2 illustrates again the table 58 that forms a part of the apparatus 42 of the mobile station 12 shown in FIG. 1. Here, a listing 64 includes a column of indicia 66 indexed together with calling numbers 68. Values of the indicia detected by the detector 56 are used to access the listing 64 to retrieve the calling number associated with the particular indicia. The calling number is used by the data call initiator 62 (also shown in FIG. 1) to initiate the terminal management session to permit the downloading of content thereto. And, a column 70 is also shown. The items contained in the column are representative of other properties and features that can be associated with a call FIG. 3 illustrates a message sequence diagram, shown generally at 74, representative of signaling generated during operation of the communication system 10 shown in FIG. 1. The signaling is generated pursuant to creation of a terminal management session and subsequent downloading of content to the mobile station 12 while also allocating charges accruing to download content to the mobile station to an appropriate party.

A request for the initiation of downloading of the content is made by the data source, here, for example, the third-party data server. A packet-formatted message representative of the request is routed, here indicated by the segment 76, through the packet data network to the short message service center 46 and the apparatus 42 positioned thereat. The request message generator 46 of the apparatus 42 detects the request, and causes the SMS message generator 44 to generate an SMS message that is routed, here indicated by the segment 80, through the radio access network, and over the radio link 14, to be delivered to the mobile station 12.

Once the SMS message is delivered to the mobile station 12 and operated upon by the receive circuitry thereof, the detector 56 of the apparatus detects the indications contained in the SMS message. And, indications detected by the detector are provided, indicated by the segment 82, to the table 58 at which the listing thereof is accessed to retrieve a calling number associated with the indicia. The retrieved calling number is provided, indicated by the segment 84, to the data call initiator 62.

The data call initiator utilizes the calling number to initiate a terminal management session. Initiation of the data call is indicated by the segments 86 and 88. A terminal management session is created, indicated by the block 92, during which data is downloaded to the mobile station. Allocation of the charges pursuant to the downloading of the content is made through the identity of the calling number, i.e., whether the calling number is a toll-free number or a regular toll number.

Figure 4:
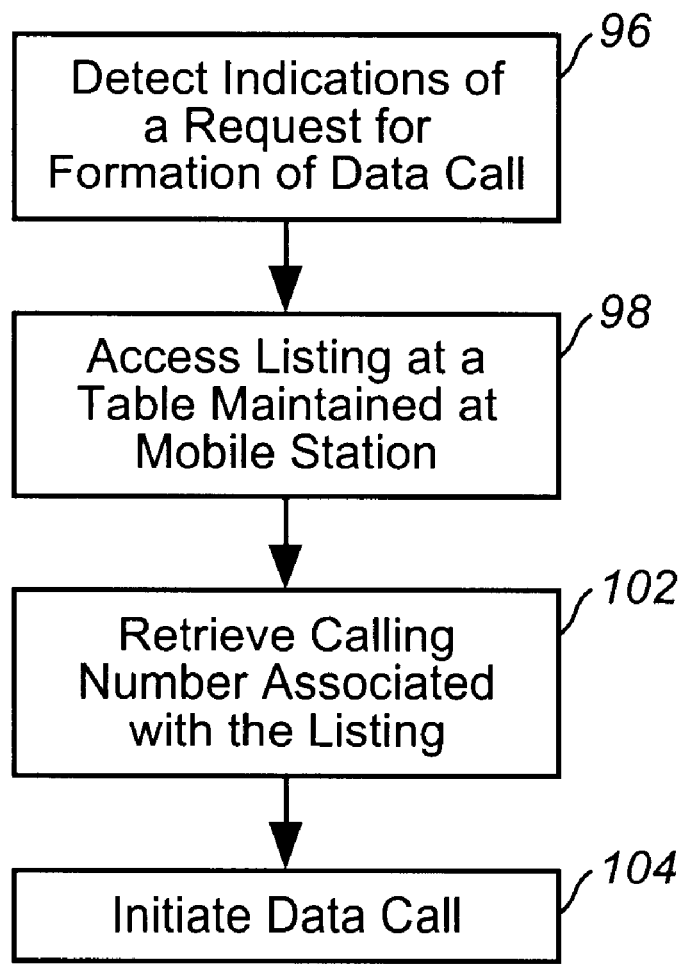
FIG. 4 illustrates a method flow diagram listing the method steps of the method of operation of an embodiment of the present invention.

FIG. 4 illustrates a method flow diagram, shown generally at 94, of the method of operation of an embodiment of the present invention. The method facilitates allocation of data call charges accruing pursuant to the data call.

First, and as indicated by the block 96, indications of a request initiated at a selected data source for formation of the data call is detected. The indications of the request include indicia identifying, at least by type, the selected data source. Then, and as indicated by the block 98, a listing at a table maintained at the mobile station is accessed. The listing includes indicia indexed together with calling numbers.

Thereafter, and as indicated by the block 102, a calling number associated with the indicia is retrieved from the listing. The calling number identifies whether the data call charges accruing pursuant to the data call shall accrue to the mobile station. And, as indicated by the block 104, the data call is initiated.

Thereby, a manner is provided by which to allocate charges accruing as a result of downloading of an application to the mobile station. Allocation of the charges is made by identifying the calling number used to create a terminal management session between the data source and the mobile station.

The previous descriptions are of preferred examples for implementing the invention, and the scope of the invention should not necessarily be limited by this description. The scope of the present invention is defined by the following claims:

What is claimed is:

1. In a radio communication system having a network part and a mobile station to which data is selectably communicated pursuant to a data call, the data sourced at a selected data source, a combination with the mobile station of apparatus for facilitating allocation of data call charges accruing pursuant to the data call, said apparatus comprising:

a detector coupled to detect indications of a request initiated at the selected data source for formation of the data call, the indications of the request including indicia identifying, at least by type, the selected data source;

a table containing a listing of the indicia included as part of the request to which said detector is coupled to detect indexed together with a calling number associated with the indicia, the calling number identifying whether the data call charges accruing pursuant to the data call shall accrue to the mobile station; and a data call initiator coupled to receive indications of the calling number indexed together with the indicia at said table and corresponding to the indicia contained in the indications of the request detected by said detector, said data call initiator for initiating the data call responsive thereto.

2. The apparatus of claim 1 wherein operation of the radio communication system is controlled by a system service provider, wherein the selected data source selectably comprises a service-provider data source and wherein the indicia included in the request to which said detector is coupled to detect indicates the selected data source to comprise the service-provider data source.

3. The apparatus of claim 1 wherein the selected data source selectably comprises a third-party data source and wherein the indicia included in the request to which said detector is coupled to detect indicates the selected data source to comprise the third-party data source.

4. The apparatus of claim 3 wherein the third-party data source has associated therewith a positional identifier and wherein the indications of the request to which said detector is coupled to receive further comprises values representative of the positional identifier.

5. The apparatus of claim 1 wherein the network part of the radio communication system comprises a packet data network portion through which IP (Internet Protocol)-formatted data is communicated and at which network devices are identified by IP addresses, the third-party data source identified by an associated IP address, and wherein the values representative of the positional identifier further contained in the indications of the request to which said detector is coupled to receive comprises the associated IP address.

6. The apparatus of claim 5 wherein the associated IP address that identifies the third-party data source has associated therewith a uniform resource locator and wherein the values representative of the positional identifier comprise values of defining the uniform resource locator.

7. The apparatus of claim 1 wherein the radio communication system provides for communication of packet-formatted messages and wherein the indications of the request to which said detector is coupled to receive is contained in a packet-formatted message.

8. The apparatus of claim 7 wherein the radio communication system comprises a digital cellular communication system that provides for short message service, wherein the packet-formatted message containing the request to which said detector is coupled to receive comprises a short message service message.

9. The apparatus of claim 1 wherein operation of the radio communication system is controlled by a system service provider, wherein third-party providers are permitted access to the radio communication system, wherein the selected data source comprises a selected one of a service-provider data source and a third-party data source and wherein the indicia included in the request and identifying, by type, the selected data source indicates the selected data source to be the selected one of the service-provider data source and the third-party data source.

10. The apparatus of claim 9 wherein the calling number associated with the indicia of the listing contained in said table comprises a toll-free number when the indicia identifies the selected data source to comprise the service-provider data source.

11. The apparatus of claim 9 wherein the calling number associated with the indicia of the listing contained in said table comprises a toll number when the indicia identifies the selected data source to comprise the third-party data source.

12. The apparatus of claim 1 wherein the listing contained at said table includes a plurality of indicia indexed together with a corresponding plurality of calling numbers, and wherein said apparatus further comprises a listing accessor for accessing the listing contained at said table to retrieve therefrom the calling number indexed together with indicia corresponding to the indicia contained on the request detected by said detector.

13. The apparatus of claim 12 wherein the indications of the calling number to which said data call initiator is coupled to receive comprises the calling number retrieved by said listing accessor, said listing accessor further for providing the calling number retrieved from the listing to said data call initiator.

14. In the radio communication system of claim 1, a combination with the network part of apparatus also for facilitating allocation of data call charges accruing pursuant to the data call, said apparatus comprising:

a request message generator coupled to receive indication of a request initiation formed at the selected data source requesting effectuation of the data call, said request message generator for generating a request message for communication to the mobile station, the request message including the indicia identifying at least by type, the selected data source.

15. The apparatus of claim 1 wherein the radio communication system defines toll numbers associated with first selected called parties and toll-free numbers associated with second selected called parties, charges accruing to a calling party when toll numbers are used to identify a called party and charges accruing to a called party when toll-free numbers are used to identify the called party, and wherein the calling number indexed together with the indicia at the listing contained at said table identifying the data call charges to accrue to the mobile station when the calling number comprises a toll number.

16. In a method for communicating in a radio communication system having a network part and a mobile station to which data, is selectably communicated pursuant to a data call, the data sourced at a selected data source, an improvement of a method for facilitating allocation of data call charges accruing pursuant to the data call, said method comprising:

detecting, at the mobile station, indications of a request initiated at the selected data source for formation of the data call, the indications of the request including indicia identifying, at least by type, the selected data source;

accessing a listing at a table maintained at the mobile station at which indicia is indexed together with calling numbers;

retrieving from the listing a calling number associated with the indicia detected during said operation of detecting, the calling number identifying whether the data call charges accruing pursuant to the data call shall accrue to the mobile station; and initiating the data call to the selected data source utilizing the calling number retrieved during said operation of retrieving.

17. The method of claim 16 further comprising the initial operations of:

forming, at the network part, a request message, the request message including the indicia identifying, at least by type, the selected data source, and sending the request message to the mobile station.

18. The method of claim 17 wherein the selected data source comprises a selected one of a service-provider data source and a third-party data source and wherein the indicia contained in the request message indicates the selected data source to be the selected one of the service-provider data source and the third-party data source.

19. The method of claim 18 wherein the network part of the radio communication system comprises a packet data network portion through which IP (Internet Protocol)-formatted data is communicated and wherein the request message formed during said operation of forming comprises an IP-formatted data message.

20. The method of claim 19 wherein the IP-formatted data message formed during said operation of forming comprises a field populated with values defining the indicia.

21. In a radio communication system having a network part and a mobile station to which data is selectably communicated pursuant to a data call, the data sourced at a selected data source, a combination with the mobile station of apparatus for facilitating a decision on use of the data at the mobile station pursuant to the data call, said apparatus comprising:

a detector coupled to detect indications of a request initiated at the selected data source for formation of the data call, the indications of the request including indicia identifying, at least by type, the selected data source;

a table containing a listing of the indicia included as part of the request to which said detector is coupled to detect indexed together with an item associated with the indicia, the item identifying a manner by which the data is to be used at the mobile station; and a data call initiator coupled to receive indications of a decision made responsive to the item indexed together with the indicia at said table and corresponding to the indicia contained in the indications of the request detected by said detector, said data call initiator for initiating the data call responsive thereto.

* * * * *